United States Patent
Eberle et al.

(10) Patent No.: US 6,196,580 B1
(45) Date of Patent: Mar. 6, 2001

(54) METHOD OF CONTROLLING AN ACTIVE OCCUPANT-HEAD PROTECTION SYSTEM IN A VEHICLE

(75) Inventors: Walter Eberle, Hochdorf; Rolf Mitschelen, Kirchheim, both of (DE)

(73) Assignee: DaimlerChrysler AG, Stuttgart-Mohringen (DE)

( * ) Notice: Subject to any disclaimer, the term of this patent is extended or adjusted under 35 U.S.C. 154(b) by 0 days.

(21) Appl. No.: 09/437,657

(22) Filed: Nov. 10, 1999

(30) Foreign Application Priority Data

Nov. 11, 1998 (DE) ............................................. 198 51 981

(51) Int. Cl.$^7$ ................................................... B60R 21/32
(52) U.S. Cl. ......................... 280/735; 280/734; 180/282
(58) Field of Search ................................. 280/735, 734; 180/282; 701/45, 1

(56) References Cited

U.S. PATENT DOCUMENTS

| | | | | |
|---|---|---|---|---|
| 4,197,919 | * | 4/1980 | Redmond | 180/269 |
| 5,157,268 | * | 10/1992 | Spies et al. | 307/10.1 |
| 5,605,202 | | 2/1997 | Dixon. | |
| 5,732,785 | | 3/1998 | Ran et al.. | |
| 5,740,041 | * | 4/1998 | Iyoda | 280/735 |

FOREIGN PATENT DOCUMENTS

| | | |
|---|---|---|
| 28 41 729 | 4/1980 | (DE). |
| 30 14 077 A1 | 10/1981 | (DE). |
| 37 37 554 A1 | 5/1989 | (DE). |
| 88 16 763 | 6/1990 | (DE). |
| 39 42 011 A1 | 7/1991 | (DE). |
| 41 16 336 C1 | 6/1992 | (DE). |
| 4239582 * | 5/1993 | (DE) ............. 280/734 |
| 4239585 * | 5/1993 | (DE) ............. 280/734 |
| 43 34 671 A1 | 4/1995 | (DE). |
| 43 35 991 A1 | 4/1995 | (DE). |
| 44 15 846 A1 | 11/1995 | (DE). |
| 196 47 660 A1 | 5/1998 | (DE). |
| 196 48 917 A1 | 5/1998 | (DE). |
| 0 593 845 | 4/1994 | (EP). |
| 593 845 A1 | 4/1994 | (EP). |

OTHER PUBLICATIONS

Fraunhofer Institut Chemische Technologie; Karlsruhe, Germany; Nov. 26/27, 1996; "Air Bag 2000" booklet.

* cited by examiner

Primary Examiner—Brian L. Johnson
Assistant Examiner—Faye M. Fleming
(74) Attorney, Agent, or Firm—Marc Lorelli

(57) ABSTRACT

Method of controlling at least one active headrest in a vehicle. The invention relates to a method of controlling an active headrest in a vehicle, in which the active headrest is triggered when predeterminable triggering conditions indicative of a vehicle collision exist, comprising the exceeding of a predeterminable collision threshold value by a characteristic variable indicative of a collision. According to the invention, the driving status of the vehicle is monitored for the presence of a reversing status and, if a predeterminable reversing status exists, the triggering of the active headrest is blocked or the collision threshold value is raised from an otherwise applicable normal value to a predeterminable maneuvering tolerance value, or the vehicle speed is sensed and the approach speed of objects approaching the rear of the vehicle is sensed, by an approach sensor system, and, if in reverse, the triggering of the active headrest is blocked or the collision threshold value is raised from an otherwise applicable normal value to a predeterminable maneuvering tolerance value if the sensed approach speed of objects approaching the vehicle lies below a predeterminable approach speed threshold.

14 Claims, 2 Drawing Sheets

METHOD OF CONTROLLING AN ACTIVE OCCUPANT-HEAD PROTECTION SYSTEM IN A VEHICLE

CROSS REFERENCE TO RELATED APPLICATION

Priority is claimed with respect to German Application No. 198 51 981.8–21 filed in Germany on Nov. 11, 1998.

BACKGROUND OF THE INVENTION

The invention concerns a method of controlling an occupant-head protection system with one or more active head protection elements in a vehicle, in which the respective active head protection element is triggered when predeterminable triggering conditions indicative of a vehicle collision exist, comprising the exceeding of a predeterminable collision threshold value by a characteristic variable indicative of a collision. An active head protection element is to be understood here as meaning a protection element for the head of a vehicle occupant which is intended to prevent the known problem of the occurrence of a cervical vertebra whiplash syndrome in the case of a collision. Such protection elements may be in particular so-called active headrests in the form of pivotable headrests or head airbags, but also other suitable safety devices for avoiding the cervical vertebra whiplash syndrome, such as for example an actively downward-pivotable seat backrest. These protection elements can be actively controlled from an initial state into a different, occupant-head-protecting state when the triggering conditions concerned exist.

DE 196 47 660 A1 discloses a triggering device for active occupant restraining systems, such as belt pretensioners or airbags, in a motor vehicle. This triggering device is assigned an acceleration sensor, which in the event of a vehicle collision provides a deceleration signal. The triggering of at least one of the restraining systems takes place when a triggering threshold of the deceleration signal is exceeded. The triggering device is further connected to an object-sensing unit, with which obstacles within close range of the vehicle are sensed and the associated relative speed is determined. The triggering threshold is varied in dependence on the speed of the vehicle itself and the relative speed of sensed obstacles. In particular when no obstacle is sensed, the triggering threshold is raised as the speed of the vehicle itself falls.

DE 43 34 671 A1 discloses a restraining system with a restraining device and a central control unit. In the control unit, a central acceleration sensor and wheel-speed sensors of an antilock braking system (ABS) are assessed to decide on the triggering of the restraining device. Even in the case of initially small vehicle decelerations, the control unit initiates a triggering of the restraining device in the event that a relatively great wheel deceleration of at least one front wheel is established by means of the wheel-speed sensors. This is intended to achieve the effect that a triggering decision is reached in time in the control unit even in the case of problem crashes, for example soft collisions.

DE 37 37 554 A1 also gives a description of a triggering system for active occupant protection devices, such as belt pretensioners and airbags, in which, for increasing the system reliability, information from an ABS, such as for example wheel speed information, is also assessed.

DE 39 42 011 A1 discloses a device for triggering safety devices for occupants of a motor vehicle, such as airbags or belt pretensioners, in which an output signal of an acceleration sensor is assessed in an evaluation circuit to ascertain whether impact not relevant to triggering, in particular a "hammer blow", on the vehicle or an acceleration of the vehicle relevant to triggering exists. Furthermore, the evaluation circuit comprises a rear-collision detection circuit, it being intended that the safety devices are not triggered in the case of a detected rear collision.

DE 43 35 991 A1 discloses a device for triggering restraining means in a motor vehicle in which, along with acceleration-sensor signals, vehicle-dynamic movement and/or status data, such as speed, brake actuation, brake pressure etc., are assessed. These signals are fed to a central control unit, for example via a data bus, and influence a triggering algorithm in such a way that in the case of high vehicle speeds fast triggering of the restraining means takes place and in the case of steering maneuvers the direction of the collision to be expected is predetermined in particular.

In DE 88 16 763 U1 there is a description of a device for triggering restraining means, which has an acceleration pickup, the signals of which are evaluated in a control unit and, if appropriate, lead to the triggering of one or more restraining means. The control unit comprises means for establishing the direction of the acceleration acting on the vehicle and consequently for distinguishing between different types of collision. Depending on the established direction of the collision, selectively suitable restraining means are triggered and the others are kept deactivated. In particular, triggering of the restraining means provided there does not take place in the event of a rear collision.

EP 0 593 845 A1 discloses a head airbag with a triggering device, which is accommodated in the headrest of a seat. The triggering of the head airbag takes place on the basis of the signal of an impact sensor which is arranged at or in the vicinity of the rear of the vehicle and is thus able to detect impact acting on the rear region as the result of a collision.

In U.S. Pat. No. 5,605,202 there is described an occupant restraining system in a vehicle, in which accident sensors, such as for example acceleration pickups, acceleration dynamometers, inertia sensors or the like, are constantly monitored and interrogated by means of a control device. This serves on the one hand for functional testing and on the other hand, if appropriate, for initiating the triggering of the restraining means. Since continuous monitoring of the faultless functioning of the accident sensors is time-intensive and adversely affects the response time of the occupant restraining system, the control unit evaluates not only signals from accident sensors but also data from additional sensors concerning the state of movement of the vehicle, such as for example wheel-speed or brake-pressure sensors. If these data indicate a situation where there is a risk of an accident, the functional monitoring of the accident sensors is suspended and an alarm status is established for the occupant restraining systems, in which the latter can trigger without delay.

In the conference publication "Airbag 2000", 3rd Int. Symp. on Sophisticated Car Occupant Safety Systems, Karlsruhe, Germany, Nov. 26 and 27, 1996, it is proposed under the title "Smart Restraint Management—An Innovative and Comprehensive Concept" by L. Grösch et al. to provide for an occupant restraining system in the front region of a vehicle a sensor which measures the approach speed of a collision obstacle. With this signal, the triggering threshold of a central accident sensor can be influenced to achieve earlier triggering of occupant restraining systems.

Under the title "Pre-Crash Sensors", in the same conference publication, H. Spies presents the concept of feeding to a central control unit for occupant restraining systems signals from obstacle approach sensors which are provided in the front region and the rear of a vehicle, signals from vehicle-dynamics sensors and vehicle data from an ABS system, but also data which concern the status of the door locking, etc. These data are evaluated in the central control unit, whereupon the occupant restraining systems are activated in such a way that they are fired step by step in a way corresponding to the accident situation and in this case the filling pressure in airbags can be adapted to requirements.

SUMMARY OF THE INVENTION

The technical problem on which the invention is based is that of providing a method of the type stated at the beginning by which the active head protection element can be reliably triggered when there is an impending risk of an accident, while on the other hand unwanted triggering caused by minor bumps, for example when backing into a parking space and other maneuvers, is ruled out to the greatest extent.

The driving status of the vehicle is monitored for driving in reverse and, if a predeterminable reversing status exists, the triggering of the active head protection element is blocked or the collision threshold value is raised from an otherwise applicable normal value to a predeterminable maneuvering tolerance value. To avoid the cervical vertebra syndrome, it is favorable to operate active head protection element, designed for example as head airbag, an actively-pivotable headrest or seat backrest, with a relatively low triggering threshold, in order that it can check or restrain the head in time in an accident situation. With the control method according to the invention, the risk of unwanted triggering on account of the low triggering threshold in the case of bumps when reversing into parking spaces, running against obstacles or curbstones is avoided to the greatest extent.

A necessary condition for the blocking of the triggering of the active head protection element or the raising of the collision threshold value is that a reverse gear of the vehicle is engaged, in a method developed as claimed in Claim 3 that a reversing speed with an absolute value below a predeterminable maneuvering speed value is detected. In this way, unwanted triggering of the active head protection element, which during normal travel has a low triggering threshold, can be avoided in a simple and low-cost manner in the case of bumps during reversing maneuvers.

The blocking of the triggering of the active head protection element or the raising of the collision threshold value that a reversing speed greater than zero is detected. This achieves the effect that, if reverse gear has already been engaged but the vehicle is still waiting on the carriageway in front of a parking space, triggering of the active head protection element is nevertheless readily possible.

The vehicle traveling direction is sensed and the approach speed of objects approaching the rear of the vehicle is sensed, by means of an approach sensor system, and, if in reverse, the triggering of the active head protection element is blocked or the collision threshold value is raised from an otherwise applicable normal value to a predeterminable maneuvering tolerance value if the sensed approach speed of objects approaching the vehicle lies below a predeterminable maneuvering speed tolerance value. In this way, unwanted triggering of the active head protection element on account of bumps during maneuvers, in particular including when reversing, against stationary or slow-moving obstacles can be ruled out.

BRIEF DESCRIPTION OF THE DRAWING

Advantageous embodiments of the invention are described below and represented in the drawings, in which.

DETAILED DESCRIPTION OF THE PREFERRED EMBODIMENT

Figure 1:
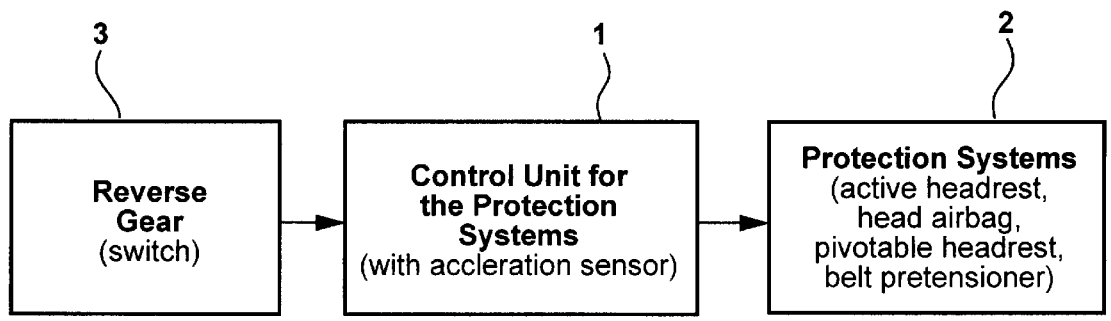
FIG. 1 shows a schematic block diagram representation of a first occupant-protection-system control unit with reverse gear detection.

FIG. 1 shows in a schematic block diagram representation a first device for controlling active occupant protection elements or protection systems in a motor vehicle. The device has a control unit 1 for the protection systems. This control unit 1 is, for example, on a CAN bus line of the motor vehicle and is able to read data from it and output data to it. In addition, the device comprises active protection systems 2, in particular active head protection elements, which in each case include an active headrest, i.e. a head airbag and/or a pivotable headrest, and/or a pivotable seat backrest with conventional triggering units, which are not represented in any more detail. The triggering units for the active protection systems are connected to the control unit 1 via a firing bus line or firing signal line. The firing of the triggering units takes place on the basis of signals output by the control unit 1 to the firing bus line or firing signal line. The control unit 1 has an acceleration sensor, to which an evaluation circuit is assigned. In the evaluation circuit, the signals of the acceleration sensor are preprocessed for forming a collision-indicative characteristic variable, which is compared with a collision threshold value. In this case, the acceleration sensor signals are filtered and/or integrated or segmentally integrated according to a conventional method, as described for example in DE 196 48 917 and in DE 41 16 336. If the absolute value of the collision-indicative characteristic variable exceeds this threshold value, a protection-system triggering signal is generated in the control unit 1. The device also includes a reverse gear switch 3, which causes reverse-gear engagement information to pass to the control unit 1 when reverse gear is engaged.

If the protection-system triggering signal is generated in the control unit 1, the control unit 1 checks whether or not it has reverse-gear engagement information. If it does not have reverse-gear engagement information, the control unit outputs the protection-system triggering signal and thus causes the triggering of one or more of the active protection systems 2. Otherwise, that is to say if reverse-gear engagement information is present, release of the protection-system triggering signal does not occur and consequently nor does triggering of the active protection systems 2.

A modification of the protection-system control method described above and carried out by the device represented in FIG. 1 is to provide a dependence of the collision threshold value on the reverse-gear engagement information. The presence of reverse-gear engagement information then does not stop the output of a protection-system triggering signal to the firing bus line or firing signal line, but causes the threshold value for the acceleration sensed by the acceleration sensor when there is reverse-gear engagement information to be set in the control unit 1 to a maneuvering tolerance value which is greater than the normal value of the threshold value when there is no reverse-gear engagement information.

Figure 2:
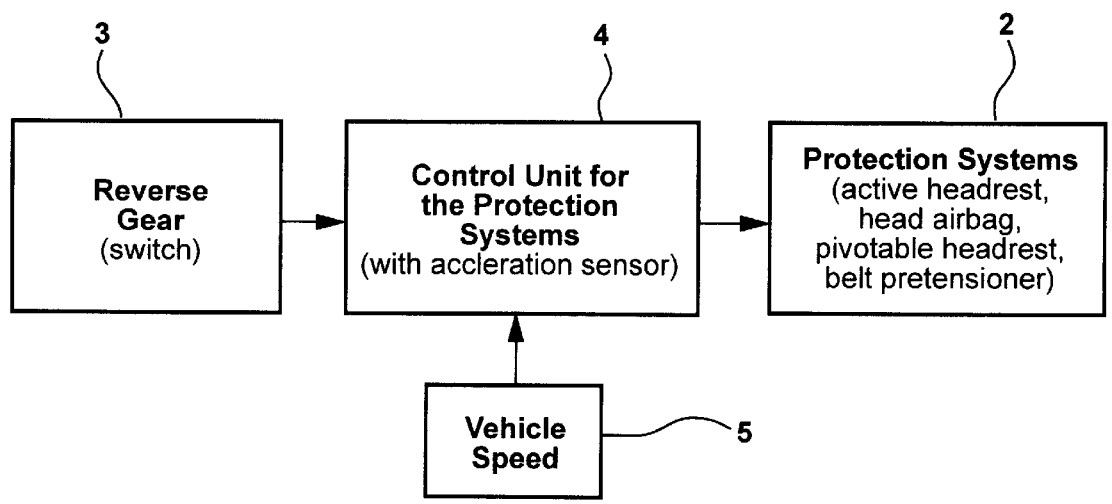
FIG. 2 shows a schematic block diagram representation of a second occupant-protection-system control unit with an additional speed sensor.

FIG. 2 shows a second device for controlling active occupant protection elements or protection systems in a motor vehicle which largely corresponds to that of FIG. 1, the same reference numerals being used for functionally corresponding components. Unlike in the case of the exemplary embodiment of FIG. 1, the device represented in FIG. 2 additionally includes a vehicle speed sensor 5. This vehicle speed sensor 5 may be formed, for example, by a wheel-speed sensor system which is connected to an ABS/ASR (traction-control) control unit, which generates the speed signal and outputs it to the CAN bus. The control unit 4 thus receives from the vehicle speed sensor the information on the instantaneous vehicle speed.

If the protection-system triggering signal is generated in the control unit 4, the control unit 4 checks whether the reverse-gear engagement information is present. Furthermore, it then determines the sensed vehicle speed and, in the case of reversing, compares it with a threshold value for reversing, which represents a maneuvering speed tolerance value. In a next step, if there is no reversing, i.e. reverse gear has not been engaged, the protection-system triggering signal for the triggering units of the protection systems 2 is passed to the firing bus line or firing signal line. Otherwise, no output of a protection-system triggering signal takes place.

Figure 3:
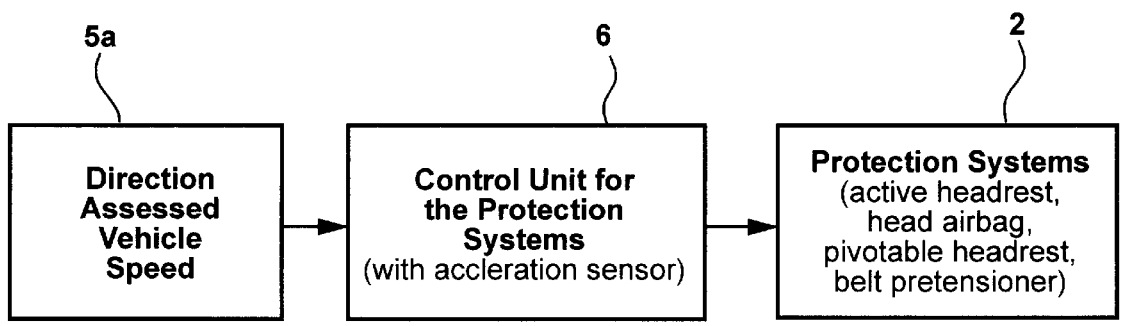
FIG. 3 shows a schematic block diagram representation of a third occupant-protection-system control unit with a direction-assessing speed sensor system.

FIG. 3 shows in a schematic block diagram representation a third device for controlling active occupant protection elements or protection systems in a motor vehicle. The device comprises a control unit 6, which, in a way corresponding to the two exemplary embodiments described on the basis of FIGS. 1 and 2, has an acceleration sensor and is connected to the CAN bus line of the motor vehicle. The device further comprises active protection systems 2 with associated triggering units in a way corresponding to the examples of FIG. 1 and FIG. 2. The device represented in FIG. 3 comprises a direction-assessing vehicle speed sensor 5a, which in turn is connected via the CAN bus line to the control unit 6 and, in addition to the absolute value, is also able to detect the direction of the vehicle speed, i.e. whether the vehicle is travelling forwards or backwards. In an evaluation circuit, the collision-indicative characteristic variable based on the acceleration signal sensed by the acceleration system is compared in the control unit 6 with a collision threshold value. If the collision-indicative characteristic variable exceeds this threshold value, the vehicle speed sensed by the vehicle speed sensor 5a is analysed in the control unit 6 with regard to its absolute value and direction. If reversing is established as a result, the absolute speed value is compared with a reversing-speed threshold value. When the protection-system triggering signal is generated, it is output by the control unit 6 to the firing bus line or firing signal line only if the collision-indicative characteristic variable has exceeded the collision threshold value and there is reversing at a speed greater than the reversing-speed threshold value. Otherwise, that is to say in the event that, although there is reversing, its speed is lower than the threshold value for reversing, no output of a safety system triggering signal takes place even if a collision-indicative characteristic variable that in absolute terms lies above the collision threshold value is formed.

A modification of the control method carried out by the device represented in FIG. 3 is to provide a dependence of the collision threshold value for the collision-indicative characteristic variable on the instantaneous vehicle speed. For this purpose, the control unit 6 establishes the collision threshold value in dependence on the determined vehicle speed value in a way corresponding to a curve stored in a memory, so that, for example in the case of maneuvering speeds with an absolute value of up to 10 km/h, the collision threshold value corresponds to a maneuvering tolerance value which is greater than the normal value of the collision threshold value in the case of vehicle speeds which exceed this absolute value.

Figure 4:
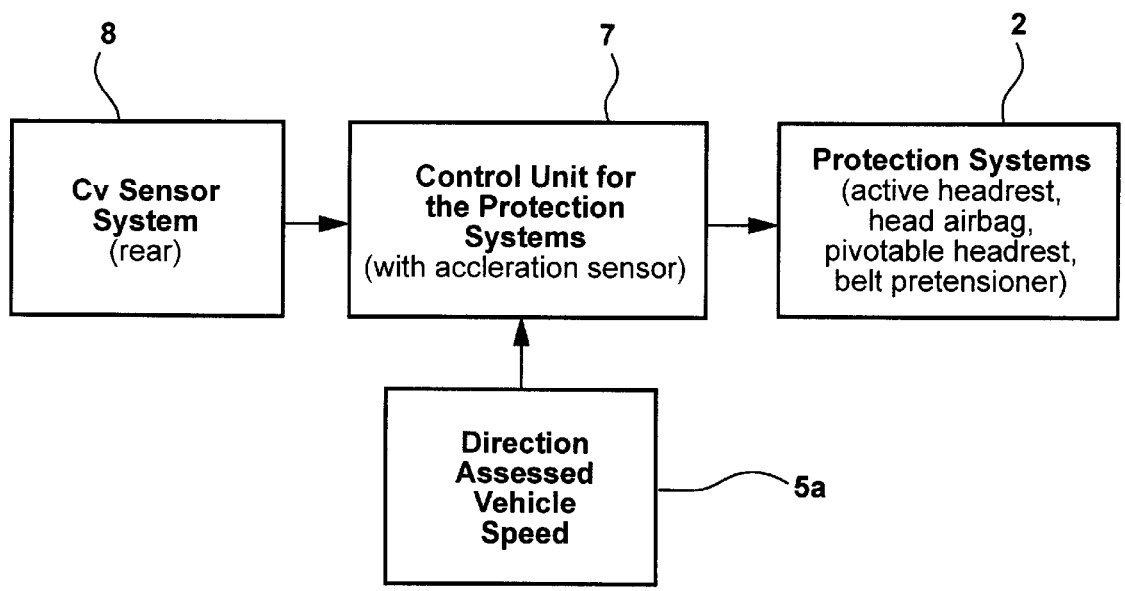
FIG. 4 shows a schematic block diagram representation of a second occupant-protection-system control unit with a rear approach sensor system.

FIG. 4 shows in a schematic block diagram representation a fourth device for controlling an active occupant protection system in a motor vehicle. In a way corresponding to the three embodiments described above, the device comprises a control unit 7 which is on the CAN bus line of the motor vehicle. Triggering units for active protection systems 2 are fired from the control unit 7 on the basis of protection-system triggering signals via firing bus lines or firing signal lines. Furthermore, the device comprises a direction-assessing vehicle speed sensor 5a and a rear-obstacle relative speed sensor 8, which is designed for example as a radar sensor and senses the relative speed at which an obstacle approaches the rear of the vehicle. Vehicle speed sensor 5a and rear-obstacle relative speed sensor 8 are connected to the control unit 7 via the CAN bus line and feed the corresponding measuring information to the said unit.

On the basis of the vehicle speed sensed, a collision threshold value is set in the control unit 7 in a way corresponding to a curve stored in a memory, for example a curve rising in a stepped form from a normal value in the case of higher speeds to a maneuvering tolerance value in the case of lower speeds. This collision threshold value is preferably greater in the case of a negative vehicle speed, i.e. reversing, than in the case of a positive vehicle speed, i.e. forward travel. Alternatively, a dependence of the collision threshold value on both the approach speed of an obstacle to the rear of the vehicle and the vehicle speed is also possible. Thus, in the case of a negative vehicle speed and an approach speed of an obstacle to the rear of the vehicle which is lower than a first approach speed threshold of, for example, 15 km/h, the collision threshold value can be raised with respect to a normal value, while such raising does not take place in the case of an approach speed of an obstacle to the rear of the vehicle above this threshold and any desired vehicle speed.

A modification of the dependence described above of the collision threshold value on both the approach speed of the obstacle to the rear of the vehicle and the vehicle speed may be that the collision threshold value is also raised if, in the case of forward travel, the approach speed of an obstacle to the rear of the vehicle goes below a second approach speed threshold of, for example, 8 km/h.

As in the three embodiments described above, the collision-indicative characteristic variable, based on an acceleration sensor signal, is compared with this threshold value in an evaluation circuit in the control unit 7. If the collision-indicative characteristic variable exceeds the collision threshold value, a protection-system triggering signal is generated in the control unit 7. The approach speed of an obstacle to the rear of the vehicle is compared in the control unit 7 with a threshold value for the approach speed, which is established in dependence on the absolute value and operating sign of the vehicle speed in a way corresponding to a curve stored in a memory, so that for example in the case of negative vehicle speeds with an absolute value of up to 10 km/h or 15 km/h, the threshold value for the approach speed is greater than in the case of vehicle speeds which are positive in comparison. An output of the protection-system triggering signal for the triggering units of the protection systems 2 to the firing bus line or firing signal line consequently takes place from the control unit 7 in the event of an object approaching the rear side only if both the acceleration sensor signal and the approach speed of the object to the rear of the vehicle, sensed by means of the rear-object relative speed sensor 8, have exceeded their respective threshold value in the control unit 7.

A modification of the control method carried out by the device represented in FIG. 4 is for only the threshold value for the approach speed of an obstacle to the rear of the vehicle or the collision threshold value to be established variably in dependence on the positive or negative vehicle speed.

It goes without saying that the present invention is not restricted to the embodiments described above. For example, it is possible in the embodiments represented in FIGS. 3 and 4 to replace the information on a direction-assessed vehicle speed fed to the control unit 6, 7 from the vehicle speed sensor 5*a* by the information on a direction-unassessed vehicle speed in connection with the reverse-gear engagement information. In a further modified exemplary embodiment, it is envisaged to feed to the control unit, in addition to or instead of the previously described sensor signals, the signal of an acceleration sensor, which is arranged on the rear of the vehicle, and/or the signal of a pressure sensor, which is accommodated in the bumper of the motor vehicle, for influencing the triggering decision by the control unit.

In a further modified embodiment, the control unit is fed a brake-activating signal, which represents a measure for the braking force applied by the vehicle brakes. This brake-activating signal is used in the control unit to calculate a hypothetical forward displacement of the vehicle occupants, from which the actual distance of the head of a vehicle occupant from the headrest can then be determined. Corresponding to this distance, the triggering units of the protection systems, in particular the triggering unit for the headrest, are fed in addition to the protection-system triggering signal a volume signal, on the basis of which an airbag in the headrest is supplied with a suitable volume of gas or a forward readjustment of the actively pivotable headrest is brought about, in order in this way to reduce or prevent whipping back of the head. According to this embodiment, a cervical vertebra syndrome of the vehicle occupants can be reduced or avoided even when braking or, in the case of a collision accident, before a subsequent rear-on collision.

Unless specifically referred to here, the system components mentioned in the description above are of any desired conventional type of construction and mode of operation. This applies both to the occupant protection systems that can be used and to the various acceleration sensors and speed sensors mentioned and to the reversing detection. The associated control unit is in each case designed in such a way that it is capable of carrying out the method according to the invention, as explained.

As becomes clear from the examples described, the present invention permits reliable triggering of the existing occupant protection systems in the case of a collision from any direction, it being made possible specifically in the case where effects occur from the rear to differentiate a genuine rear-on collision, in which the protection systems are triggered, from harmless bumps, such as those that occur when maneuvering in reverse. Unwanted triggering of the protection systems caused by bumps when parking or running over a curbstone are avoided, while otherwise relatively low triggering thresholds can be set, in order for example to prevent by means of a suitably activated active headrest the known whiplash trauma which indeed occurs even in the case of minor rear-on collision accidents at collision speeds of between about 10 km/h and 40 km/h.

While the above description constitutes the preferred embodiment of the invention, it will be appreciated that the invention is susceptible to modification, variation, and change without departing from the proper scope or fair meaning of the accompanying claims.

What is claimed is:

1. A method of controlling an active occupant-head protection system in a vehicle, comprising the steps of:

triggering at least one active head protection element in the presence of predeterminable triggering conditions indicative of a vehicle collision, which comprise the exceeding of a predeterminable collision threshold value by a collision-indicative characteristic variable, and monitoring the driving status of the vehicle for the presence of a reversing status, and if a predeterminable reversing status exists, the triggering of the active head protection element is blocked or the collision threshold value is raised from an otherwise applicable normal value to a predeterminable maneuvering tolerance value.

2. The method according to claim 1, wherein a necessary condition for the blocking of the triggering of the active head protection element is that a reverse gear of the vehicle is engaged.

3. The method according to claim 1, wherein a necessary condition for the blocking of the triggering of the active head protection element is that a reversing speed with an absolute value which lies below a predeterminable maneuvering speed tolerance value is detected.

4. The method according to claim 1, wherein a necessary condition for the blocking of the triggering of the active head protection element is that a reversing speed greater than zero is detected.

5. A method of controlling an active occupant-head protection system in a vehicle, comprising the steps of:

triggering at least one active head protection element in the presence of predeterminable triggering conditions indicative of a vehicle collision, which comprise the exceeding of a predeterminable collision threshold value by a collision-indicative characteristic variable, and monitoring the driving status of the vehicle for the presence of a reversing status, and if a predeterminable reversing status exists, the collision threshold value is raised from an otherwise applicable normal value to a predeterminable maneuvering tolerance value.

6. The method according to claim 5, wherein, a necessary condition for the raising of the collision threshold value takes place only when a reverse gear of the vehicle is engaged.

7. The method according to claim 6, wherein the raising of the collision threshold value takes place only when a reversing speed with an absolute value which lies below a predeterminable maneuvering speed tolerance value is detected.

8. The method according to claim 7, wherein the raising of the collision threshold value takes place only when a reversing speed greater than zero is detected.

9. A method of controlling an active occupant-head protection system in a vehicle, comprising the steps of:

triggering the active occupant-head protection element in the presence of predeterminable triggering conditions indicative of a vehicle collision, which comprise the exceeding of a predeterminable collision threshold value by a collision-indicative characteristic variable, and sensing the travelling direction of the vehicle and sensing the approach speed of objects approaching the rear of the vehicle, by means of an approach sensor system, and, if in reverse, the collision threshold value is raised from an otherwise applicable normal value to a predeterminable maneuvering tolerance value if the sensed approach speed of objects approaching the vehicle lies below a predeterminable first approach speed threshold.

10. The method according to claim 9, wherein the collision threshold value is also raised if, in the case of forward travel, the approach speed of an obstacle to the rear of the vehicle goes below a second approach speed threshold.

11. The method according to claim 9, wherein the triggering of the active headrest is blocked or the collision threshold value is raised if the vehicle speed additionally lies below a predeterminable maneuvering tolerance value.

12. A method of controlling an active occupant-head Protection system in a vehicle, comprising the steps of:

triggering the active occupant-head protection element in the presence of predeterminable triggering conditions indicative of a vehicle collision, which comprise the exceeding of a predeterminable collision threshold value by a collision-indicative characteristic variable, and sensing the travelling direction of the vehicle and sensing the approach speed of objects approaching the rear of the vehicle, by means of an approach sensor system, and, if in reverse, the triggering of the active occupant-head protection element is blocked if the sensed approach speed of objects approaching the vehicle lies below a predeterminable first approach speed threshold.

13. The method according to claim 12, wherein the triggering is also blocked if, in the case of forward travel, the approach speed of an obstacle to the rear of the vehicle goes below a second approach speed threshold.

14. The method according to claim 13, wherein the triggering of the active headrest is blocked or the collision threshold value is raised if the vehicle speed additionally lies below a predeterminable maneuvering tolerance value.

* * * * *